(12) United States Patent
Huang et al.

(10) Patent No.: US 11,835,441 B2
(45) Date of Patent: Dec. 5, 2023

(54) SAMPLE CLASSIFICATION DEVICE, SAMPLE CLASSIFICATION SYSTEM, AND SAMPLE CLASSIFICATION METHOD

(71) Applicant: Industrial Technology Research Institute, Hsinchu (TW)

(72) Inventors: Chih-Hung Huang, Chiayi (TW); Yuan-Fa Lee, Tainan (TW); Miao-Chang Wu, Tainan (TW); Sheng-Li Chang, Hsinchu County (TW); Chih-Ching Liao, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 219 days.

(21) Appl. No.: 17/308,059

(22) Filed: May 5, 2021

(65) Prior Publication Data
US 2022/0163439 A1 May 26, 2022

(30) Foreign Application Priority Data
Nov. 20, 2020 (TW) ................................ 109140733

(51) Int. Cl.
*G01N 15/14* (2006.01)
*G01N 21/25* (2006.01)
(Continued)

(52) U.S. Cl.
CPC ..... *G01N 15/1434* (2013.01); *G01N 15/1404* (2013.01); *G01N 21/255* (2013.01);
(Continued)

(58) Field of Classification Search
None
See application file for complete search history.

(56) References Cited

U.S. PATENT DOCUMENTS

| 7,297,272 B2 | 11/2007 | Min et al. |
| 8,197,770 B2 | 6/2012 | Gable et al. |

(Continued)

FOREIGN PATENT DOCUMENTS

| CN | 1846126 A | * 10/2006 | ......... G01N 15/1434 |
| CN | 111295578 | 6/2020 | |

(Continued)

OTHER PUBLICATIONS

"Office Action of Taiwan Counterpart Application", dated Jul. 29, 2021, p. 1-p. 6.

(Continued)

*Primary Examiner* — Rufus L Phillips
(74) *Attorney, Agent, or Firm* — JCIPRNET

(57) ABSTRACT

A sample classification device including a carrier, a first detection module, and a sample pipeline is provided. The first detection module includes a first light-emitting device, a second light-emitting device, and a first optical sensing device. The first light emitting device is located on the carrier and used to emit light of a first wavelength. The second light emitting device is located on the carrier and used to emit light of a second wavelength. The first wavelength is different from the second wavelength. The first optical sensing device is located on the carrier and between the first light emitting device and the second light emitting device. The sample pipeline is located above the carrier and passes above the first optical sensing device.

10 Claims, 13 Drawing Sheets

(51) Int. Cl.
*G01N 15/00* (2006.01)
*G01N 21/17* (2006.01)

(52) U.S. Cl.
CPC ... *G01N 21/256* (2013.01); *G01N 2015/0084* (2013.01); *G01N 2015/149* (2013.01); *G01N 2015/1488* (2013.01); *G01N 2021/1736* (2013.01)

(56) References Cited

U.S. PATENT DOCUMENTS

| | | | |
|---|---|---|---|
| 2006/0002597 | A1 | 1/2006 | Rowe |
| 2008/0171951 | A1 | 7/2008 | Fell |
| 2009/0279071 | A1* | 11/2009 | Bado .................. A61M 1/1692 356/440 |
| 2012/0277902 | A1* | 11/2012 | Sharpe ............... G01N 15/1404 209/132 |
| 2015/0132766 | A1 | 5/2015 | Yasuda et al. |
| 2016/0178573 | A1* | 6/2016 | Sheppard, Jr. ......... G01N 33/49 356/40 |
| 2018/0052147 | A1 | 2/2018 | Zeng et al. |
| 2018/0238845 | A1* | 8/2018 | Eliason ................. G01N 30/74 |
| 2018/0313743 | A1* | 11/2018 | Dixon .................. G01N 15/1434 |
| 2019/0049388 | A1* | 2/2019 | Jensen .................. G01N 21/31 |
| 2019/0226985 | A1* | 7/2019 | Roberts ................ G01N 21/274 |
| 2021/0114035 | A1* | 4/2021 | Wu .................... B01L 3/502792 |
| 2021/0123851 | A1* | 4/2021 | Steltenkamp ...... G01N 15/1056 |

FOREIGN PATENT DOCUMENTS

| | | |
|---|---|---|
| TW | M495230 | 2/2015 |
| TW | I593547 | 8/2017 |
| TW | I646192 | 1/2019 |
| TW | I656218 | 4/2019 |
| TW | I672489 | 9/2019 |

OTHER PUBLICATIONS

Gnanatheepam Einstein, et al., "Diffuse reflectance spectroscopy for monitoring physiological and morphological changes in oral cancer", Optik vol. 127, Issue 3, Feb. 2016, pp. 1479-1485.

Andrew J. Mason, et al., "Analysis of Multi-channel Microfluidics for Serial Dilution in Lab-on-CMOS Platforms", 2017 IEEE 60th International Midwest Symposium on Circuits and Systems (MWSCAS), Aug. 6-9, 2017, pp. 623-626.

Qian Wang, et al., "A spectral and morphologic method for white blood cell classification", Optics & Laser Technology 84, May 31, 2016, pp. 144-148.

* cited by examiner

SAMPLE CLASSIFICATION DEVICE, SAMPLE CLASSIFICATION SYSTEM, AND SAMPLE CLASSIFICATION METHOD

CROSS-REFERENCE TO RELATED APPLICATION

This application claims the priority benefit of Taiwan application serial no. 109140733, filed on Nov. 20, 2020. The entirety of the above-mentioned patent application is hereby incorporated by reference herein and made a part of this specification.

TECHNICAL FIELD

The disclosure relates to a sample processing device, a sample processing system, and a sample processing method, and more particularly to a sample classification device, a sample classification system, and a sample classification method.

BACKGROUND

Before testing and analyzing a sample solution containing multiple samples, the samples in the sample solution must be separated and classified. For example, platelet rich plasma (PRP) injection is one of the most commonly adopted autologous cell therapies. Since blood contains cells such as plasma, platelets, red blood cells and white blood cells, to obtain PRP, it is necessary to separate the cells in the blood and then classify these cells.

At present, some methods using sensing approaches such as optical penetration and refraction have been developed for classifying separated cells. However, due to the low resolution of the current optical classification approach, it is impossible to accurately distinguish cells such as platelets, plasma, red blood cells and white blood cells. It is particularly difficult to distinguish samples that have similar colour and light transmittances as PRP and plasma, and misjudgement is likely to occur.

In summary, there is an urgent need for new sample processing devices, systems, and methods.

SUMMARY

An embodiment of the disclosure provides a sample classification device, a sample classification system, and a sample classification method, which can accurately determine the type of a sample.

An embodiment of the disclosure provides a sample classification device including a carrier, a first detection module, and a sample pipeline. The first detection module includes a first light-emitting device, a second light-emitting device, and a first optical sensing device. The first light-emitting device is located on the carrier and configured to emit light of a first wavelength. The second light-emitting device is located on the carrier and configured to emit light of a second wavelength. The first wavelength is different from the second wavelength. The first optical sensing device is located on the carrier and between the first light-emitting device and the second light-emitting device. The sample pipeline is located above the carrier and passes above the first optical sensing device.

The disclosure provides a sample classification method, which uses the sample classification device for classification process. The classification process may include the following steps. A standard reflected light spectrum database corresponding to multiple golden samples is provided. The sample is irradiated with the first light-emitting device and the second light-emitting device alternately. The first optical sensing device receives the reflected light generated by the first light-emitting device and the second light-emitting device irradiating the sample, so as to obtain the reflected light spectrum of the sample. The reflected light spectrum of the sample is compared with the standard reflected light spectrum database to determine the type of the sample.

This disclosure provides another sample classification method, which uses the sample classification device for classification process. The classification process may include the following steps. A standard reflected light spectrum database corresponding to multiple golden samples is provided. The sample is irradiated with one selected from the first light-emitting device and the second light-emitting device and one selected from the third light-emitting device and the fourth light-emitting device, wherein the light emitted by one selected from the first light-emitting device and the second light-emitting device and the light emitted by one selected from the third light-emitting device and the fourth light-emitting device have different wavelengths. The first optical sensing device receives the reflected light generated by one selected from the first light-emitting device and the second light-emitting device irradiating the sample, and the second optical sensing device receives the reflected light generated by one selected from the third light-emitting device and the fourth light-emitting device irradiating the sample, so as to obtain the reflected light spectrum of the sample. The reflected light spectrum of the sample is compared with the standard reflected light spectrum database to determine the type of the sample.

This disclosure provides a sample classification system, including computer equipment, a sample separating module, a sample classification device, and a pipeline valve control module. The sample separating module is coupled to the computer equipment. The sample classification device is connected to the sample separating module and coupled to the computer equipment. The pipeline valve control module is connected to the sample classification device and coupled to the computer equipment.

This disclosure provides another sample classification method, including the following steps. The sample classification system is provided. The standard reflected light spectrum database corresponding to multiple golden samples is stored in the computer equipment. The sample separating module is configured to separate multiple samples of different types in the sample solution. Different types of samples are sequentially provided to the sample classification device for classification process, wherein the classification process compares the reflected light spectrum of the sample obtained by the sample classification device with the standard reflected light spectrum database, so as to determine the type of the sample. The pipeline valve control module determines the flow direction of different types of samples according to the classification results of the classification process.

Based on the above, in the sample classification device, sample classification system, and sample classification method provided in this disclosure, the sample in the sample pipeline is irradiated by multiple light-emitting devices having different wavelengths, and then the optical sensing device receives the reflected light of the sample to obtain the reflected light spectrum of the sample. Thereafter, the reflected light spectrum of the sample is compared with the standard reflected light spectrum database to accurately determine the type of the sample.

In order to make the features and advantages of the disclosure more comprehensible, the following specific embodiments are described in detail with reference to the accompanying drawings.

DETAILED DESCRIPTION OF DISCLOSED EMBODIMENTS

Figure 1:
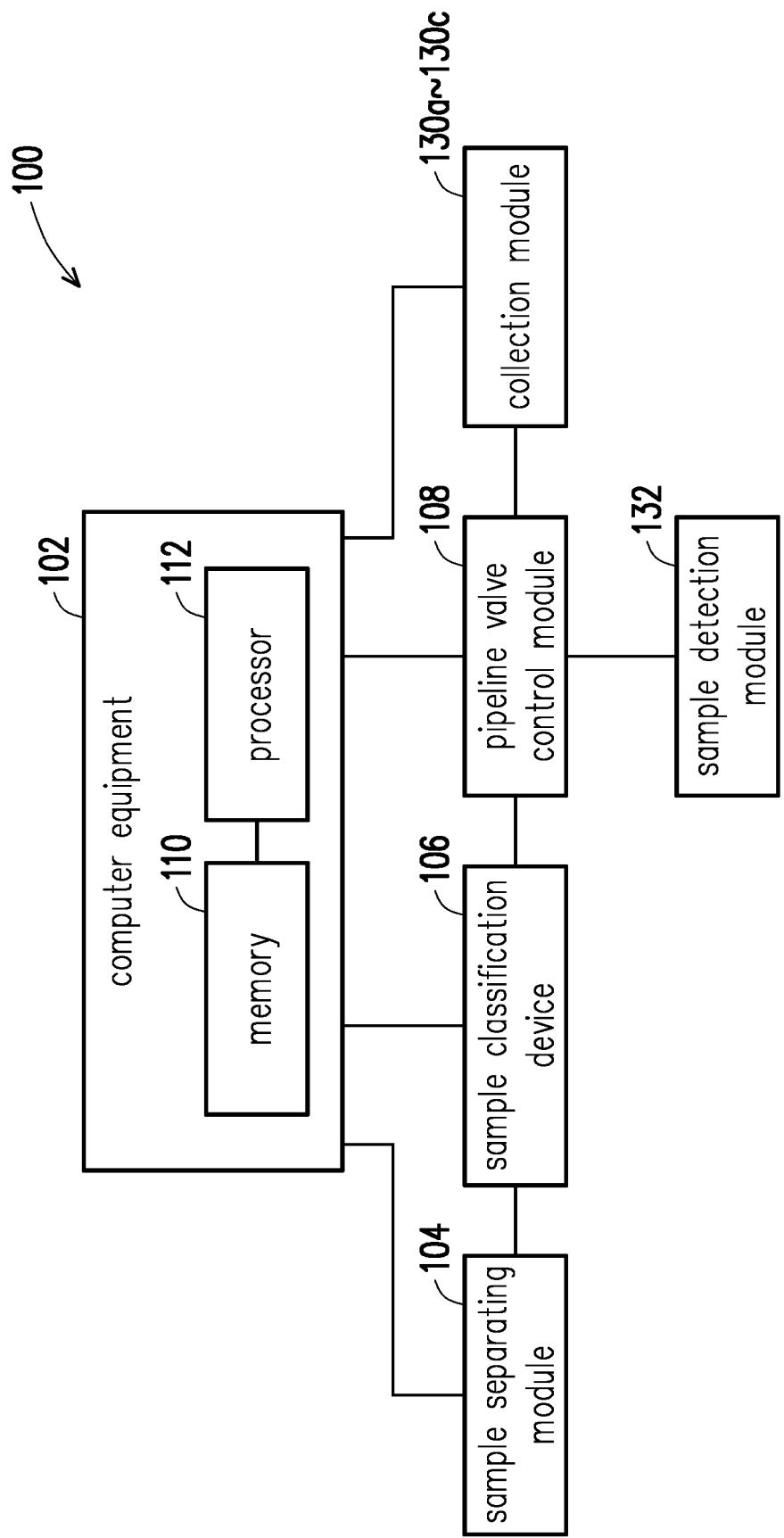
FIG. 1 is a schematic view of a sample classification system according to an embodiment of the disclosure.
Figure 2:
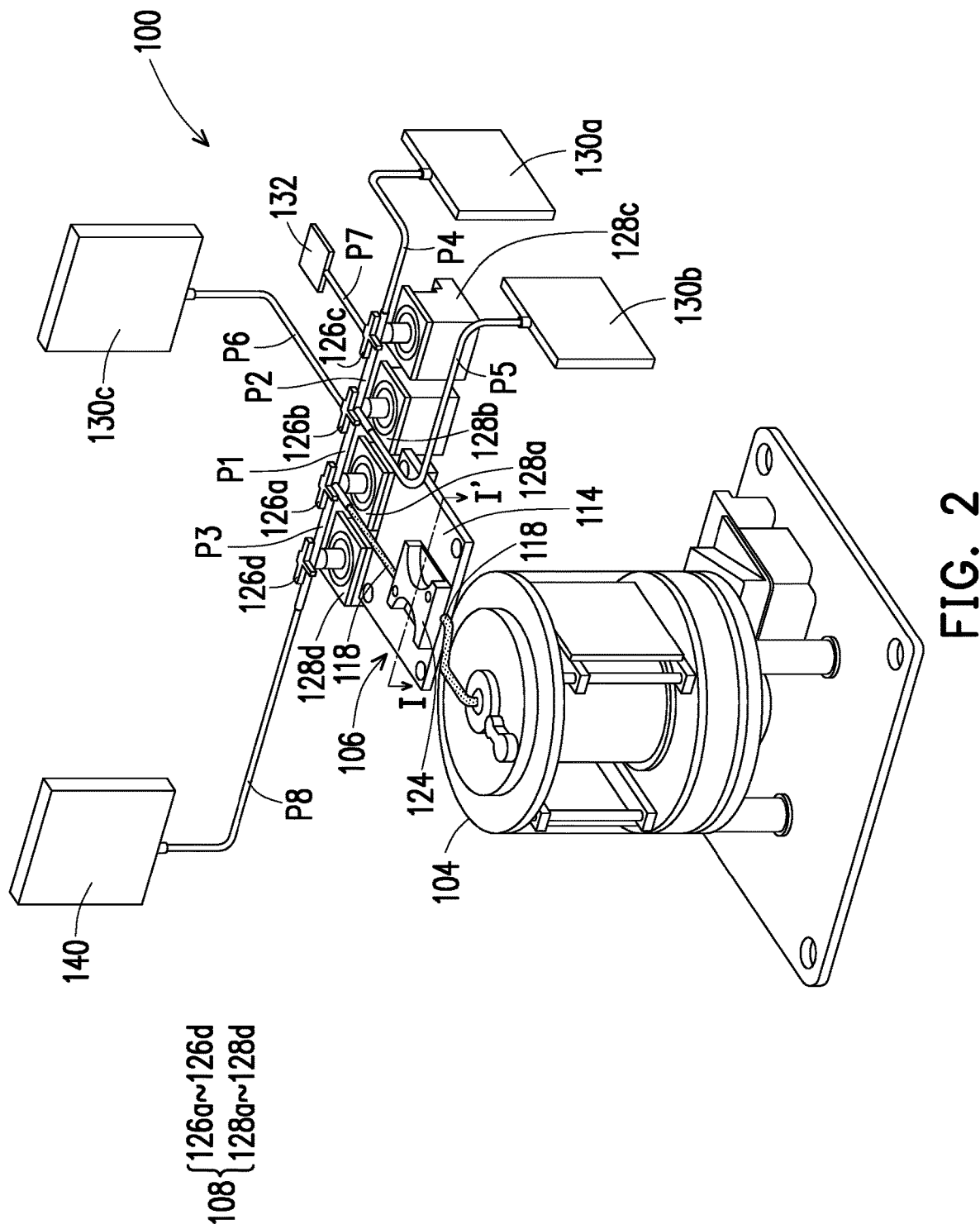
FIG. 2 is a perspective view of a sample classification system according to an embodiment of the disclosure.
Figure 3:
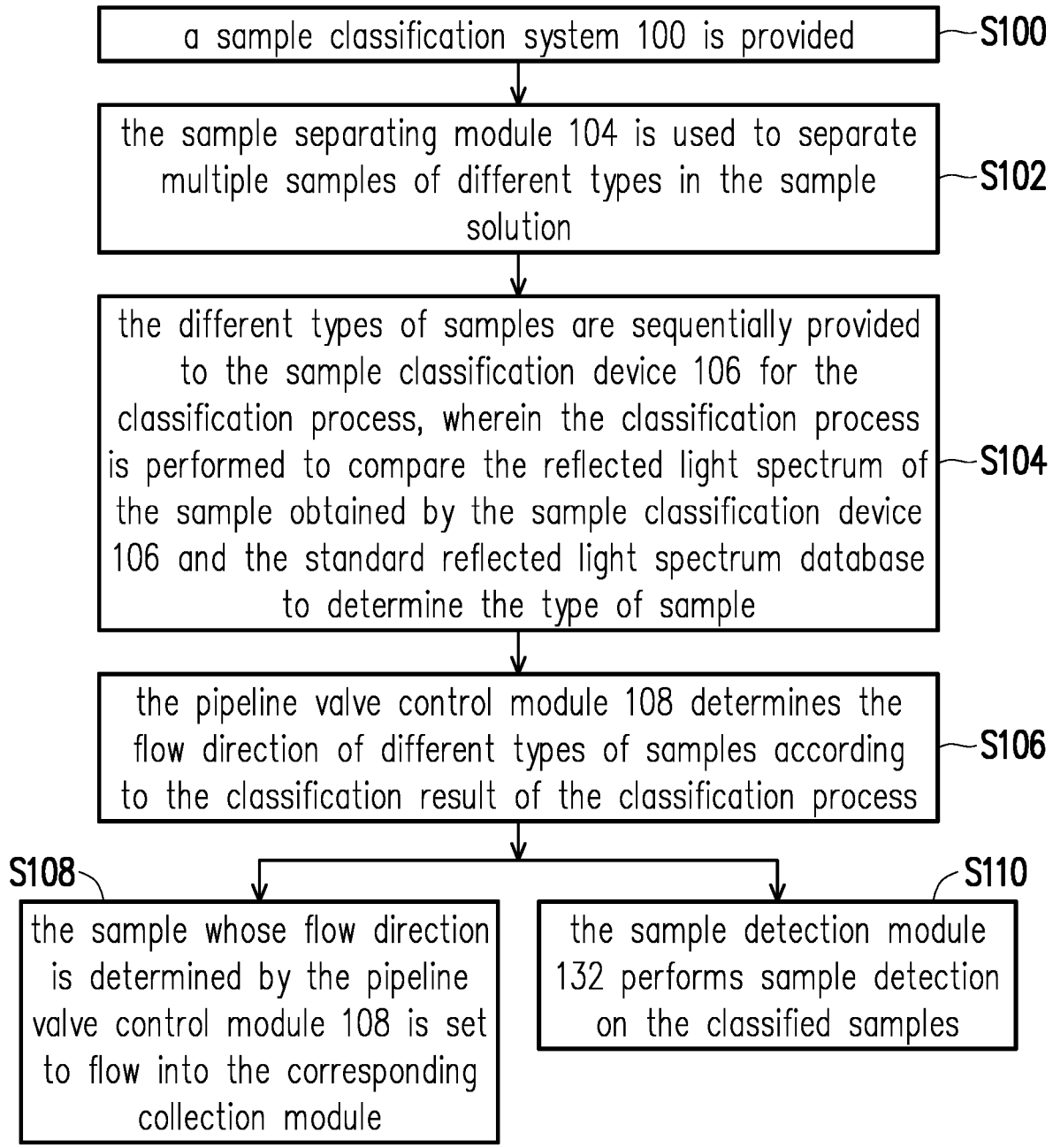
FIG. 3 is a flowchart of a sample classification method according to an embodiment of the disclosure.
Figure 4:
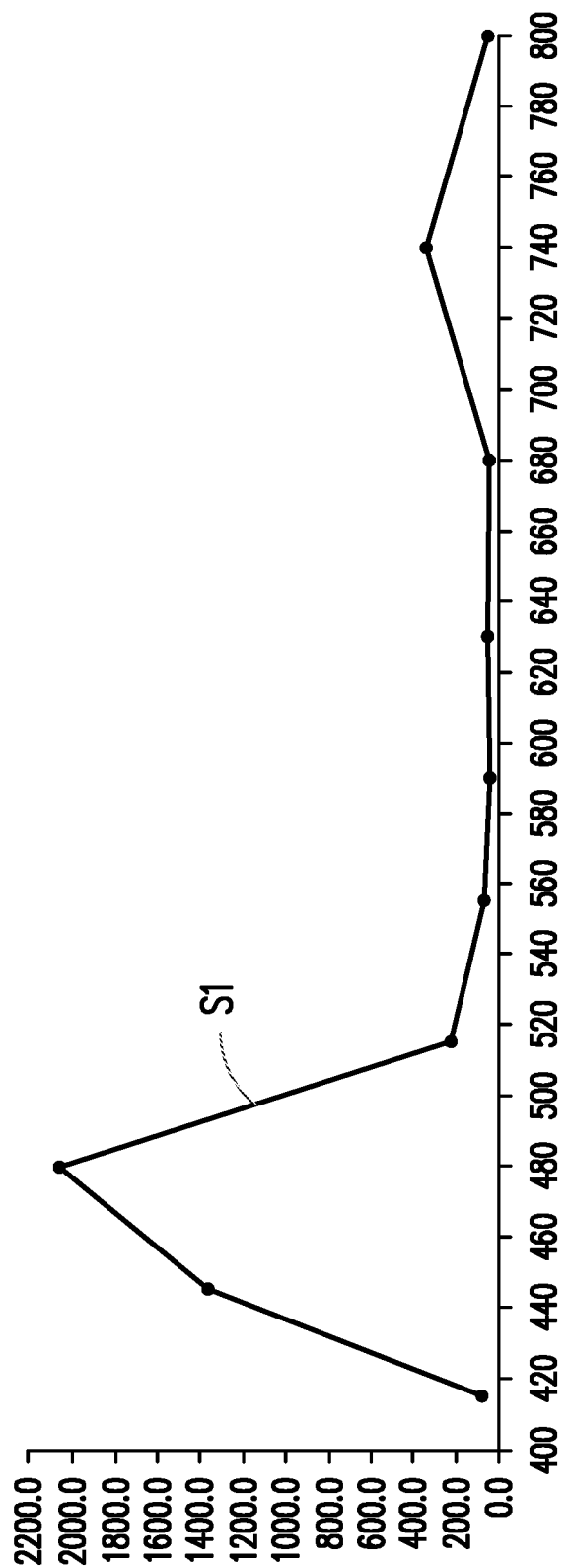
FIG. 4 is a standard reflected light spectrum diagram of PRP corresponding to blue light.
Figure 5:
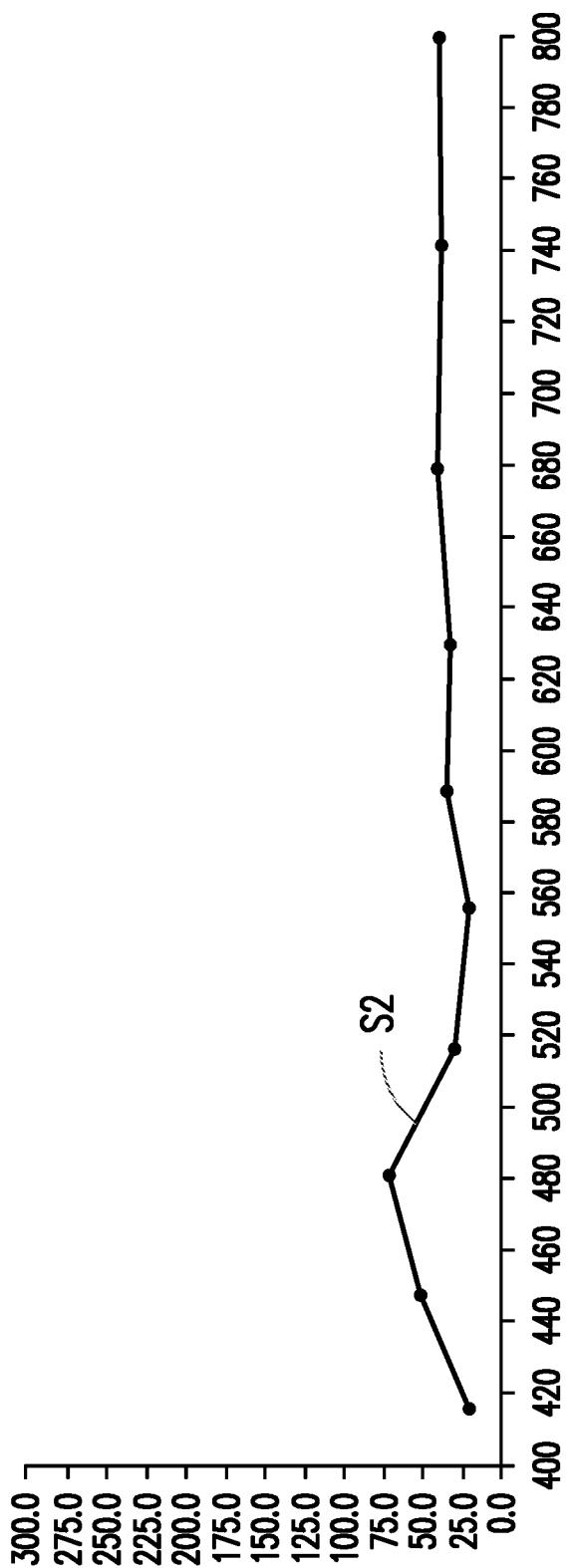
FIG. 5 is a standard reflected light spectrum diagram of PRP corresponding to red light.
Figure 6:
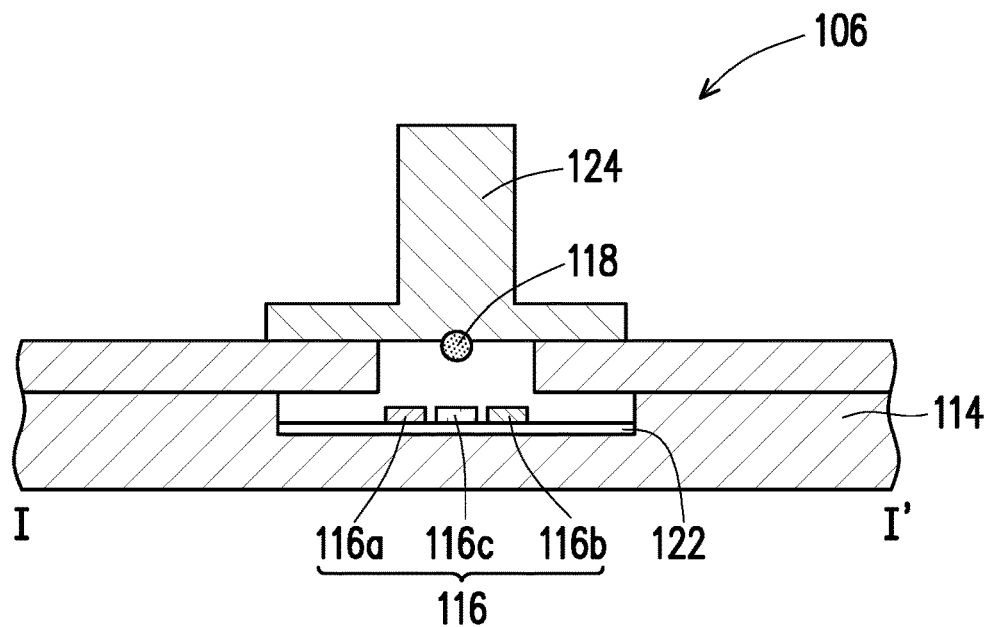
FIG. 6 is a cross-sectional view of the sample classification device taken along the cross-sectional line I-I' in FIG. 2.
Figure 7:
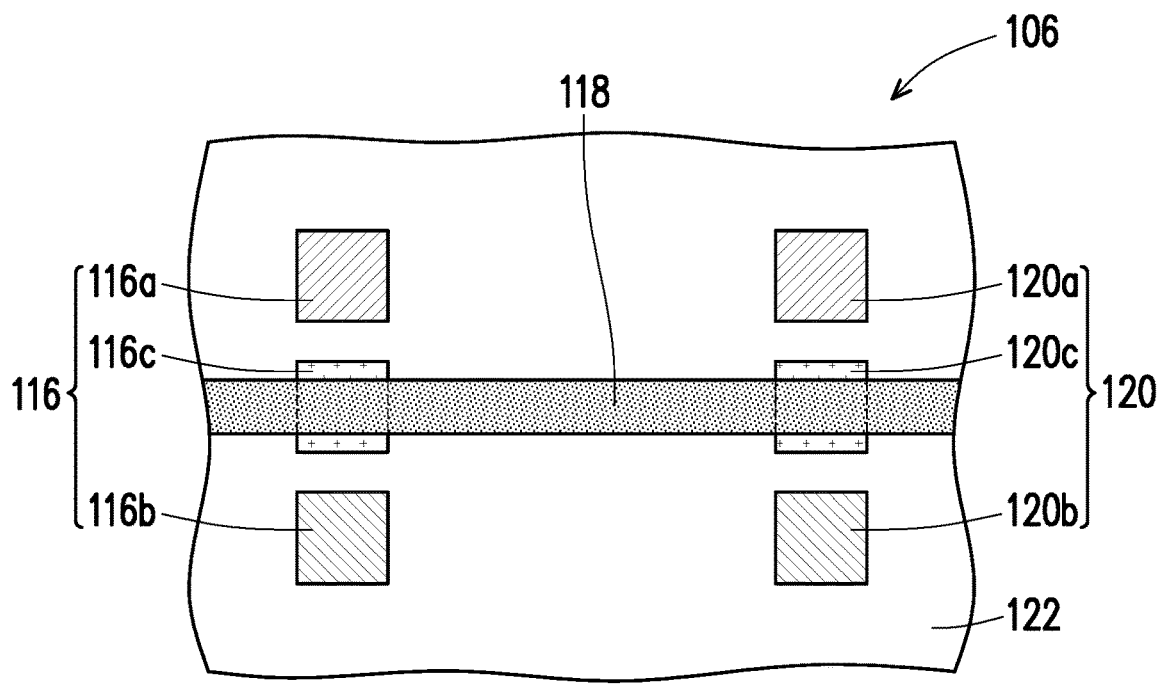
FIG. 7 is a top view of some components of a sample classification device according to an embodiment of the disclosure.
Figure 8A:
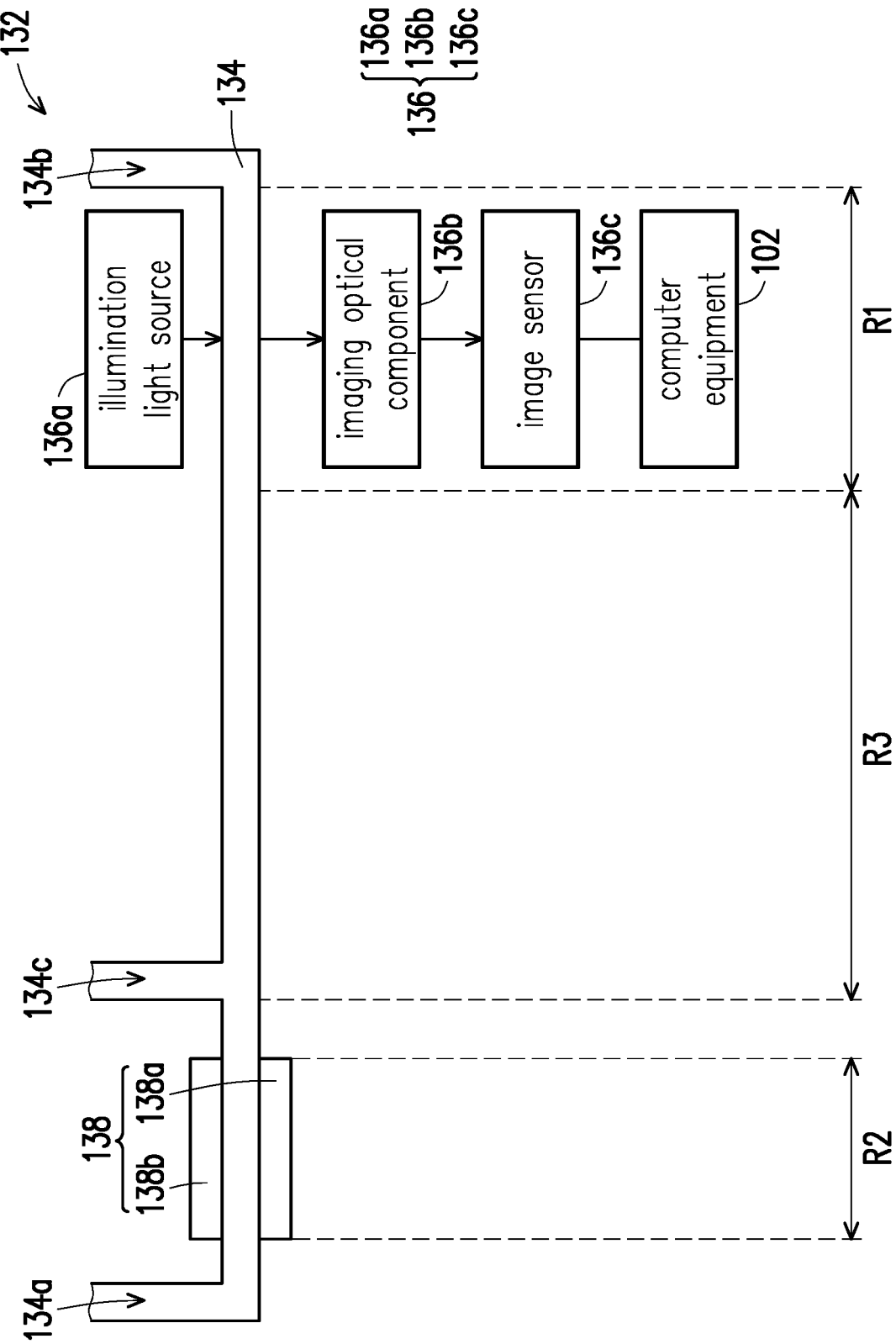
FIG. 8A to FIG. 8C are schematic views of sample detection modules according to some embodiments of the disclosure.
Figure 8B:
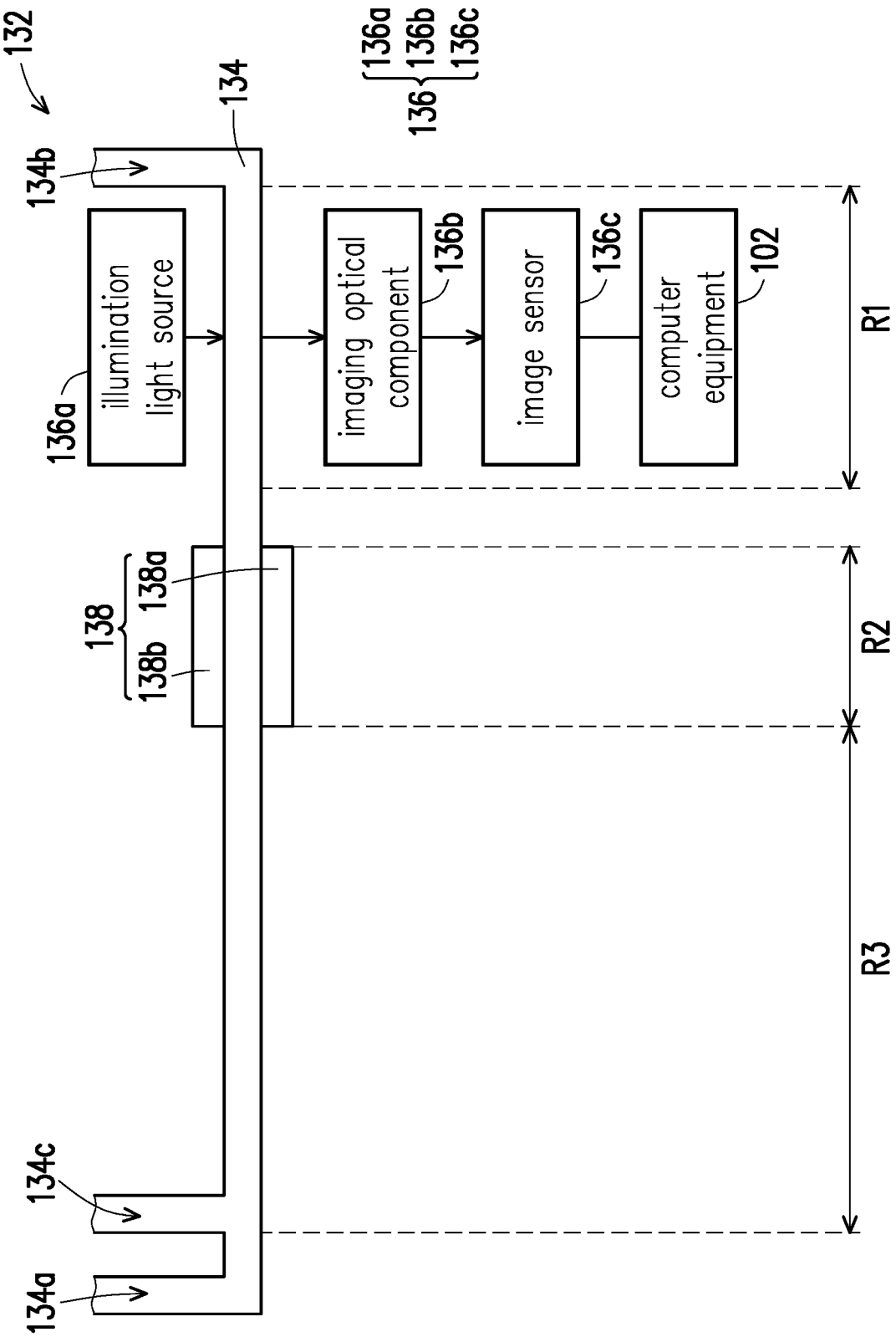
Figure 8C:
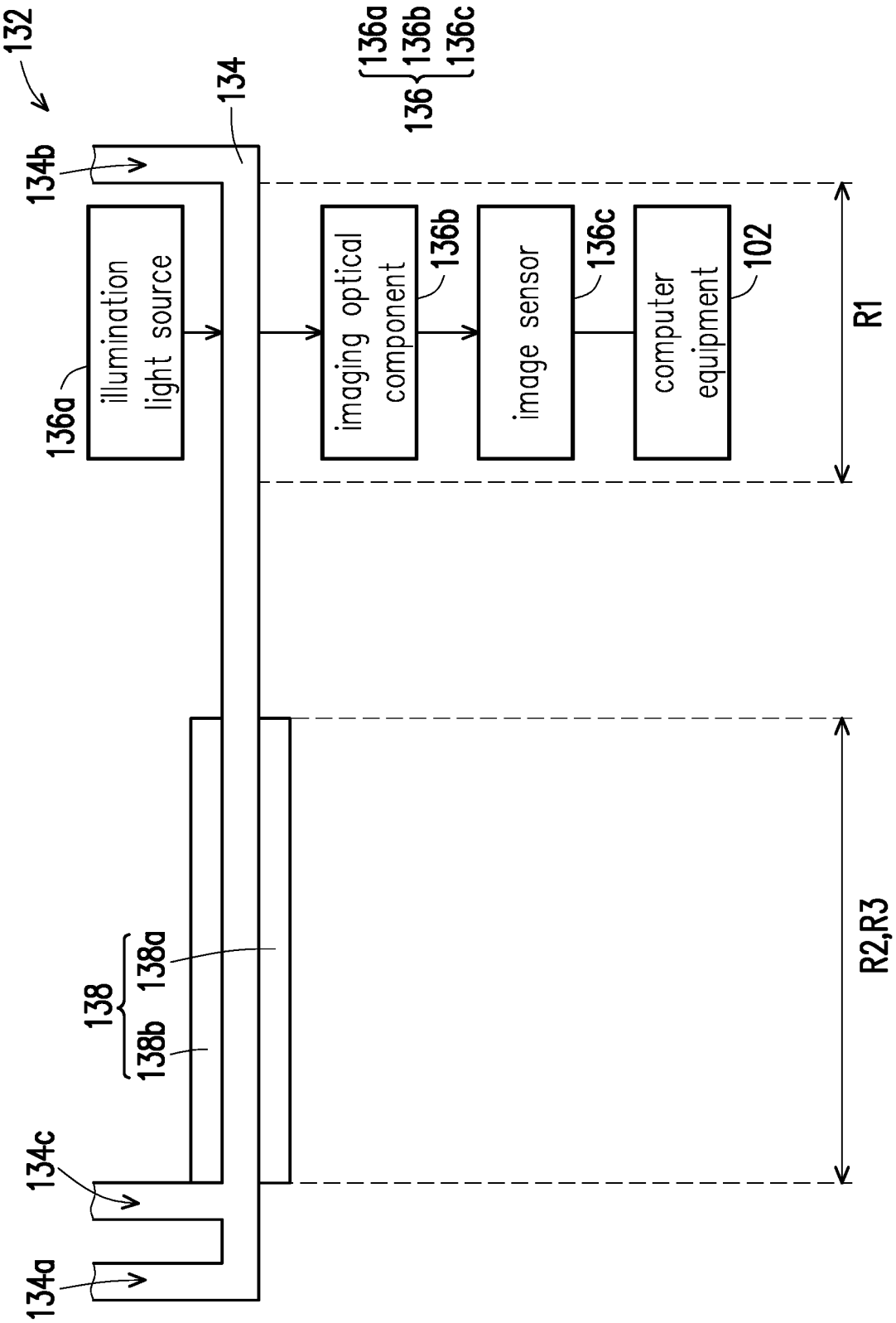
Figure 9A:
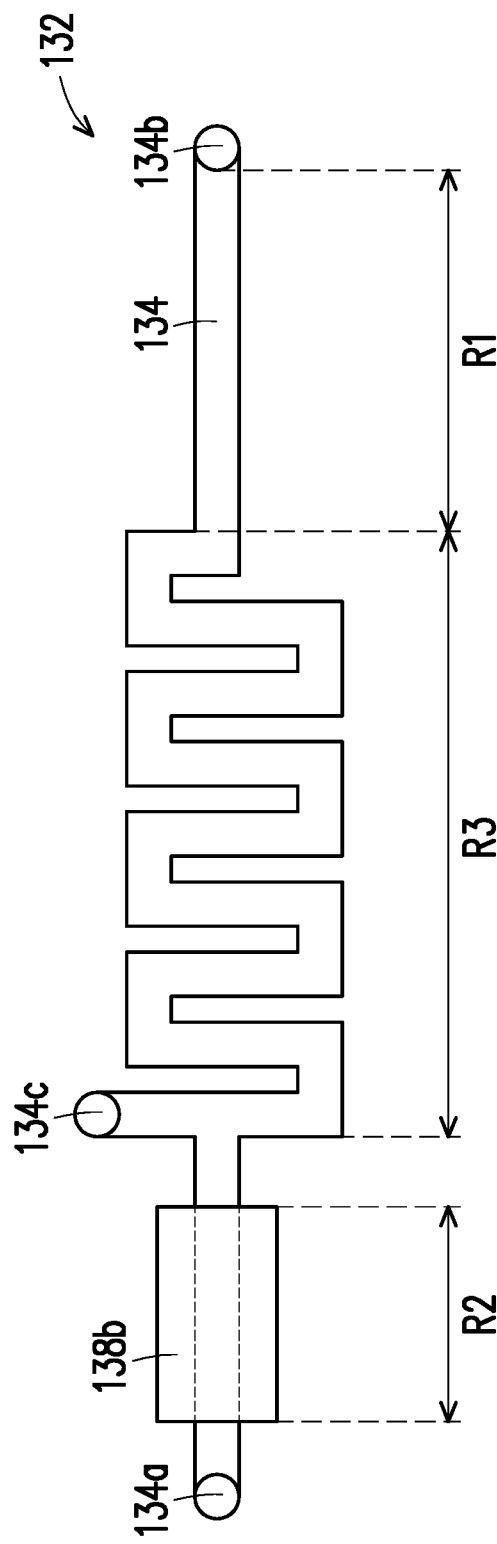
FIG. 9A to FIG. 9C are top views of FIG. 8A to FIG. 8C, respectively.
Figure 9B:
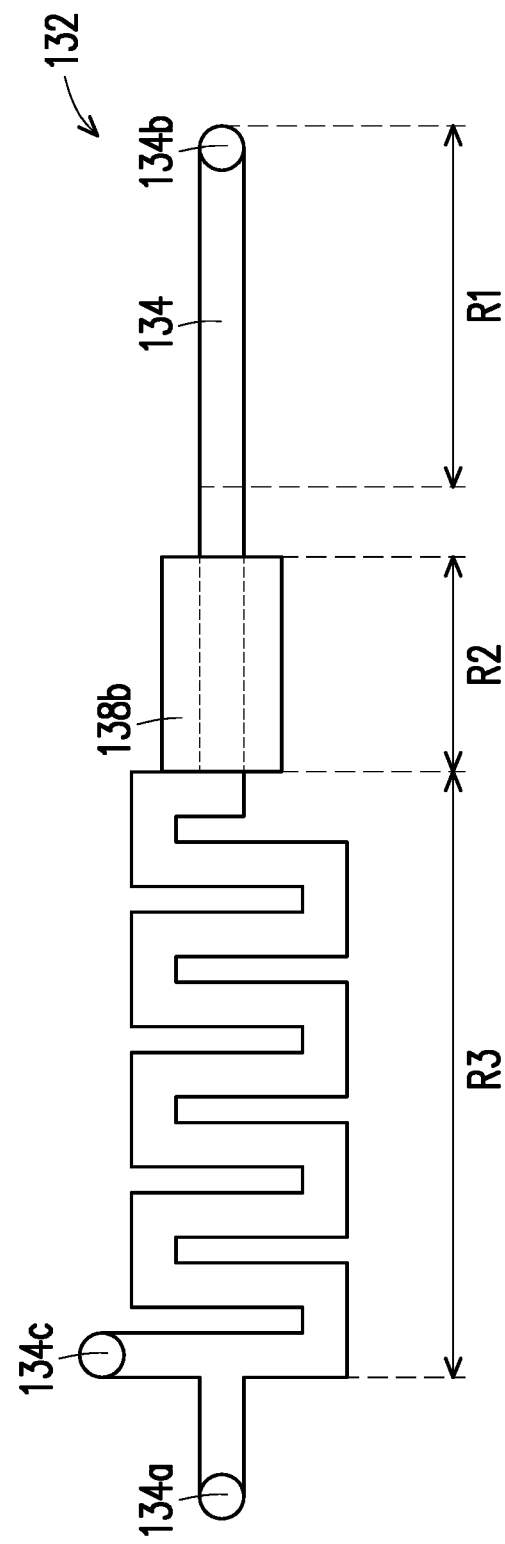
Figure 9C:
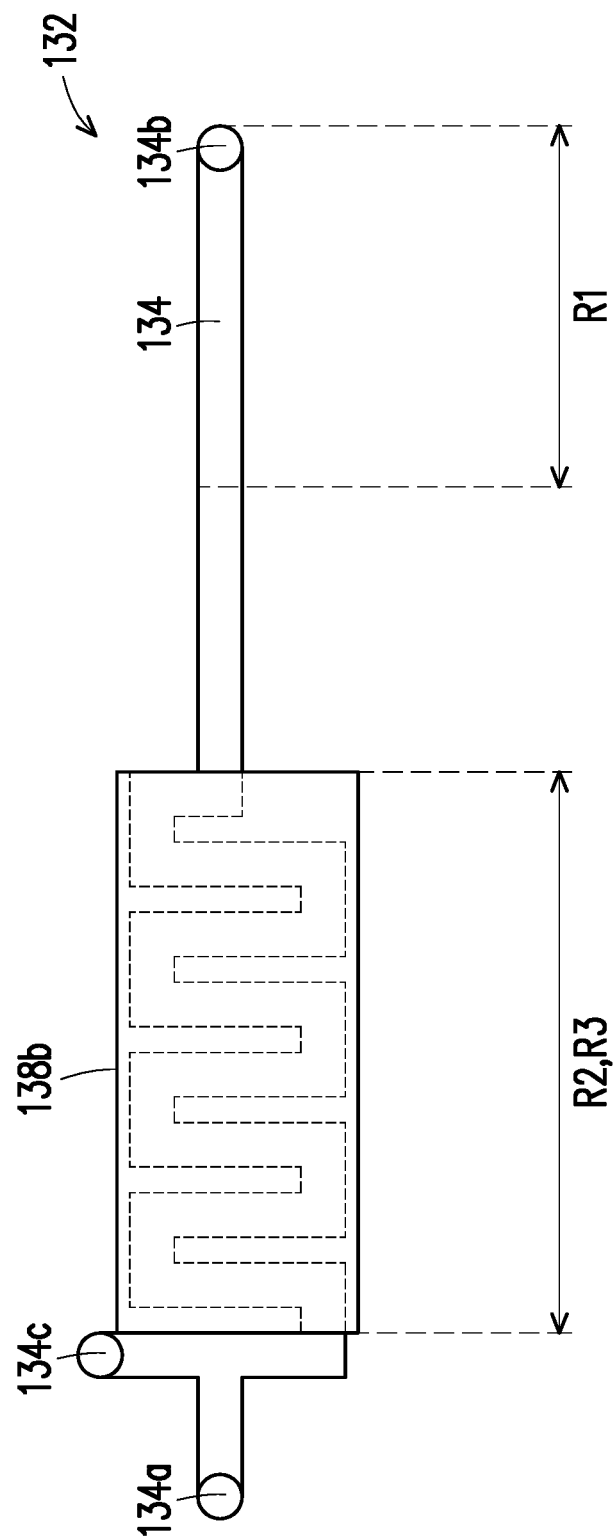
Figure 10:
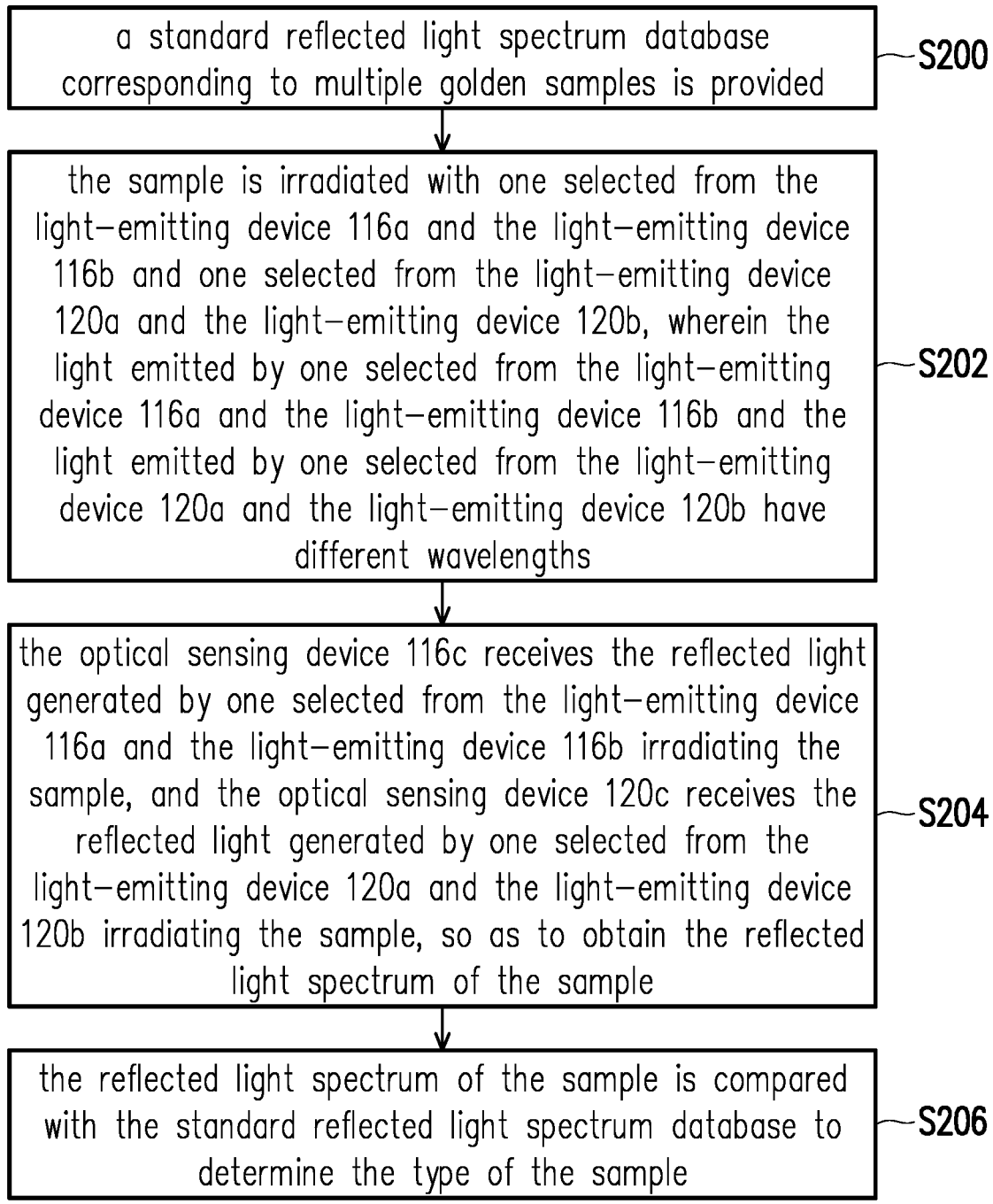
FIG. 10 is a flowchart of a classification process according to an embodiment of the disclosure.
Figure 11:
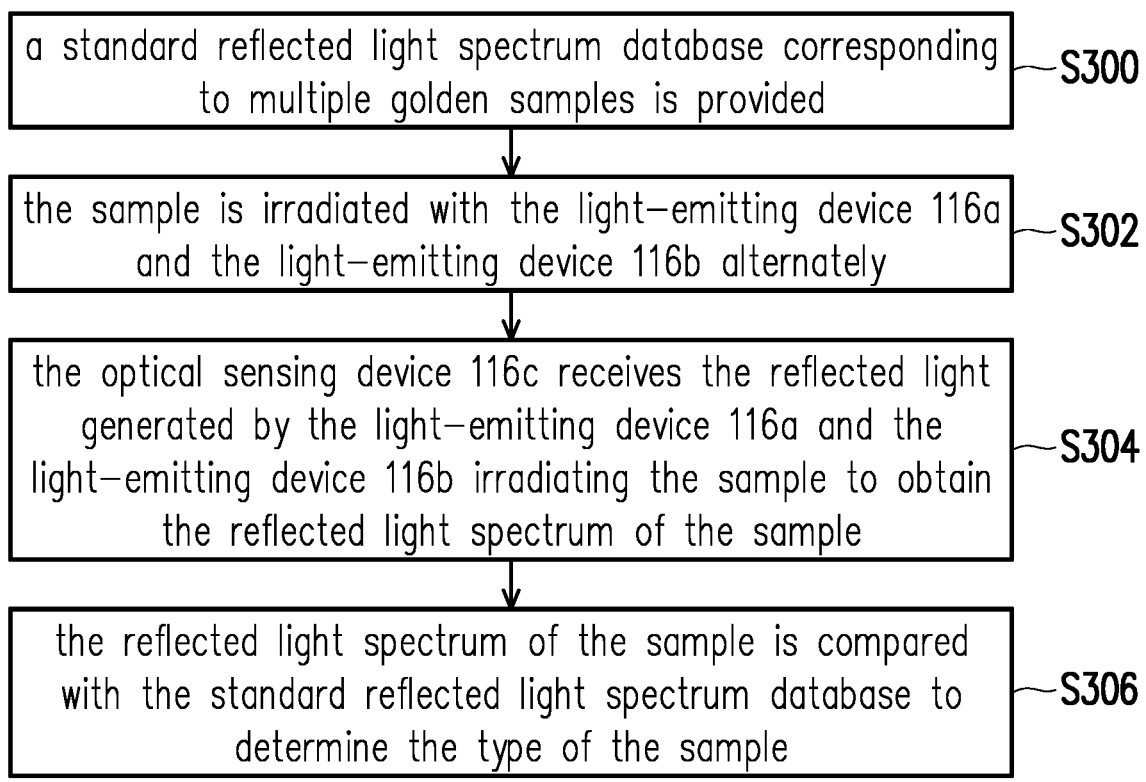
FIG. 11 is a flowchart of a classification process according to another embodiment of the disclosure.

FIG. 1 is a schematic view of a sample classification system according to an embodiment of the disclosure. FIG. 2 is a perspective view of a sample classification system according to an embodiment of the disclosure. In FIG. 2, the computer device in FIG. 1 is omitted to simplify the drawing. FIG. 3 is a flowchart of a sample classification method according to an embodiment of the disclosure. FIG. 4 is a standard reflected light spectrum diagram of PRP corresponding to blue light. FIG. 5 is a standard reflected light spectrum diagram of PRP corresponding to red light. FIG. 6 is a cross-sectional view of the sample classification device taken along the cross-sectional line I-I' in FIG. 2. FIG. 7 is a top view of some components of a sample classification device according to an embodiment of the disclosure. FIG. 8A to FIG. 8C are schematic views of sample detection modules according to some embodiments of the disclosure. FIG. 9A to FIG. 9C are top views of FIG. 8A to FIG. 8C, respectively. In FIG. 9A to FIG. 9C, some components (for example, the positive electrode 138a and the optical microscope 136) in FIG. 8A to FIG. 8C are omitted to simplify the drawings. FIG. 10 is a flowchart of a classification process according to an embodiment of the disclosure. FIG. 11 is a flowchart of a classification process according to another embodiment of the disclosure.

Hereinafter, the sample classification method and sample classification system 100 of this embodiment will be described with reference to FIG. 1 to FIG. 11.

Please refer to FIG. 1 to FIG. 3, proceed to step S100, a sample classification system 100 is provided. The sample classification system 100 is suitable for classifying multiple samples contained in a sample solution. For example, the sample solution may be blood, and the blood may include samples such as PRP, plasma, and red blood cells, but the disclosure is not limited thereto. In other embodiments, the sample classification system 100 is also suitable for classifying other biological samples.

The sample classification system 100 includes computer equipment 102, a sample separating module 104, a sample classification device 106, and a pipeline valve control module 108. The computer equipment 102 may include a memory 110 and a processor 112. The computer equipment 102 stores a standard reflected light spectrum database corresponding to multiple golden samples. For example, the standard reflected light spectrum database can be stored in the memory 110. The standard reflected light spectrum database may include multiple standard reflected light spectra. Each golden sample has a corresponding standard reflected light spectrum. In some embodiments, each golden sample may have multiple standard reflected light spectra corresponding to light (e.g., blue light, red light, etc.) of multiple specific wavelengths. For example, as shown in FIG. 4 and FIG. 5, PRP may have a standard reflected light spectrum S1 corresponding to blue light (for example, blue light with a wavelength of 470 nm) and a standard reflected light spectrum S2 corresponding to red light (for example, red light with a wavelength of 636 nm). As shown in FIG. 4 and FIG. 5, the standard reflected light spectrum S1 and the standard reflected light spectrum S2 may have different characteristic spectra. The method of obtaining the standard reflected light spectrum is, for example, using a light-emitting device with a specific wavelength (such as the wavelength range of blue light and red light) to irradiate a known golden sample (such as PRP, plasma and red blood cells, etc.), and then using the optical sensing device to receive the reflected light generated by the light-emitting device irradiating the golden sample. Thereafter, the obtained reflected light spectrum information is stored in the memory 110.

In addition, the memory 110 is suitable for storing a standard reflected light spectrum database, a module (such as a computing module) or software for the processor 112 to access and execute, so as to implement the related means and sample classification method described in the various embodiments of the disclosure.

The processor 112 is coupled to the memory 110. In this embodiment, the processor 108 may be a central processing unit (CPU) or other programmable general-purpose or special-purpose microprocessors, digital signal processors (DSP), a programmable controller, application specific integrated circuits (ASIC), a programmable logic device (PLD), other similar processors, or a combination of these processor circuits.

The sample separating module 104 is coupled to the computer equipment 102. The sample separating module 104 is, for example, a centrifuge or a rotary concentrator. The centrifuge can separate samples in the sample solution through coaxial high-speed centrifugation, and the centrifuge can have a high-speed centrifugal drive motor with 0~8000 rpm.

The sample classification device 106 is connected to the sample separating module 104 and coupled to the computer equipment 102. The sample classification device 106 can classify the samples from the sample separating module 104, that is, suitable for determining the type of the sample.

Please refer to FIG. 2, FIG. 6 and FIG. 7, the sample classification device 106 includes a carrier 114, a detection module 116 and a sample pipeline 118. The carrier 114 may be a carrier board. The material of the carrier 114 is, for example, a light-absorbing material, such as plastic, resin, or rubber. In some embodiments, the material of the carrier 114 may be a black light-absorbing material. The carrier 114 can be manufactured by a three-dimensional (3D) printing method or an injection molding method.

The detection module 116 includes a light-emitting device 116a, a light-emitting device 116b, and an optical sensing device 116c. The light-emitting device 116a is located on the carrier 114 and is configured to emit light of the first wavelength. The light-emitting device 116b is located on the carrier 114 and is configured to emit light of the second wavelength. The light-emitting device 116a and the light-emitting device 116b are, for example, light-emitting diodes (LED) or laser and the like, but the disclosure is not limited thereto. The first wavelength is different from the second wavelength. For example, the range of the first wavelength may be greater than or equal to 380 nm and less than 570 nm, and the range of the second wavelength may be greater than or equal to 570 nm and less than or equal to 800 nm, but the disclosure is not limited thereto. In this embodiment, the light-emitting device 116a is exemplified as a blue light-emitting device that can emit light with a wavelength close to 470 nm, and the light-emitting device 116b is exemplified as a red light-emitting device that can emit light with a wavelength close to 636 nm, but the disclosure is not limited thereto. The optical sensing device 116c is located on the carrier 114 and between the light-emitting device 116a and the light-emitting device 116b. For example, the light-emitting device 116a, the light-emitting device 116b, and the optical sensing device 116c may be located on the same plane. The optical sensing device 116c can receive the reflected light generated by the light-emitting device 116a and the light-emitting device 116b irradiating the sample in the sample pipeline 118 to obtain the reflected light spectrum of the sample.

The sample pipeline 118 is located above the carrier 114 and passes above the optical sensing device 116c. In this embodiment, the sample pipeline 118 is exemplified as passing directly above the optical sensing device 116c. The sample classification device 106 is connected to the sample separating module 104 through the sample pipeline 118 to receive samples from the sample separating module 104. The light-emitting device 116a and the light-emitting device 116b can be located on different sides of the sample pipeline 118, thereby reducing the mutual influence of light sources, and effectively arranging the light-emitting device 116a and the light-emitting device 116b, so as to reduce the volume of the sample classification device 106. In addition, if the light-emitting device 116a and the light-emitting device 116b are located on the same side of the sample pipeline 118, the light sources will be affected by each other, and the light-emitting device 116a and the light-emitting device 116b cannot be effectively arranged, resulting in an increase in the volume of the sample classification device 106.

In addition, the sample classification system 100 is a reflection spectrum analysis architecture, that is, the optical sensing device 116c can receive the reflected light generated by the light-emitting device 116a and the light-emitting device 116b irradiating the sample in the sample pipeline 118, so as to obtain the reflected light spectrum of the sample. Therefore, compared to a transmissive analysis architecture that uses the penetrating light penetrating the sample pipeline 118 for analysis, the sample classification system 100 is less susceptible to the concentration and type (e.g., tissue fluid concentration and cell type) of the sample in the sample pipeline 118 and thus having less changes, and is less likely to misjudge samples with similar colours.

In addition, the sample classification device 106 may further include at least one of a detection module 120, a circuit board 122, and a cover 124.

The detection module 120 includes a light-emitting device 120a, a light-emitting device 120b, and an optical sensing device 120c. The light-emitting device 120a is located on the carrier 114 and is configured to emit light of the first wavelength. That is, the light emitted by the light-emitting device 116a and the light-emitting device 120a may have the same wavelength. The light-emitting device 120b is located on the carrier 114 and is configured to emit light of the second wavelength. That is, the light emitted by the light-emitting device 116b and the light-emitting device 120b may have the same wavelength. The optical sensing device 120c can receive the reflected light generated by the light-emitting device 120a and the light-emitting device 120b irradiating the sample in the sample pipeline 118 to obtain the reflected light spectrum of the sample.

The optical sensing device 116c and the optical sensing device 120c are, for example, optical multi-channel sensing devices. The optical multi-channel sensing device may have multiple visible light spectrum channels. For example, the optical multi-channel sensing device may be an optical multi-channel sensor chip (product model: AS7341) manufactured by ams AG. The method for obtaining the reflected light spectrum is illustrated as follows. When the sample classification device 106 irradiates the sample in the sample pipeline 118 through the light-emitting devices 116a, 116b, 120a, and 120b, the sample absorbs light of a specific wavelength, and the optical sensing device 116c and the optical sensing device 120c receives the reflected light generated by irradiating the sample, and a filtering process is performed on different wavelengths through the multiple channels of the optical sensing device 116c and the optical sensing device 120c, then the filtered wavelengths are combined into the reflected light spectrum of the sample.

The optical sensing device 120c is located on the carrier 114 and between the light-emitting device 120a and the light-emitting device 120b. For example, the light-emitting device 120a, the light-emitting device 120b, and the optical sensing device 120c may be located on the same plane. The sample pipeline 118 passes above the optical sensing device 120c. In this embodiment, the sample pipeline 118 is exemplified as passing directly above the optical sensing device 120c. The light-emitting device 120a and the light-emitting device 120b may be located on different sides of the sample pipeline 118. The light-emitting device 116a and the light-emitting device 120b may be located on different sides of the sample pipeline 118. The light-emitting device 116b and the light-emitting device 120a may be located on different sides of the sample pipeline 118.

In addition, the distance between the light-emitting device 116a and the light-emitting device 116b may be smaller than the distance between the light-emitting device 116a and the light-emitting device 120b and the distance between the light-emitting device 116b and the light-emitting device 120a. The distance between the light-emitting device 120a and the light-emitting device 120b may be smaller than the distance between the light-emitting device 116a and the light-emitting device 120b and the distance between the light-emitting device 116b and the light-emitting device 120a. In this way, it is possible to prevent the mutual interference between the light from the detection module 116 and the light from the detection module 120.

The circuit board 122 is located on the carrier 114. The detection module 116 and the detection module 120 are, for example, configured in the manner that the detection module 116 and the detection module 120 are first arranged on the circuit board 122, and then the circuit board 122 provided with the detection module 116 and the detection module 120 are disposed on the carrier 114.

The cover 124 covers the detection module 116, part of the sample pipeline 118 and the detection module 120, thereby preventing interference caused by external light sources during the classification process. The material of the cover 124 is, for example, a light-absorbing material, such as plastic, resin, or rubber. In some embodiments, the material of the cover 124 may be a black light-absorbing material. The cover 124 can be manufactured by a 3D printing method or an injection molding method.

In this embodiment, the sample classification device 106 is exemplified as including two sets of detection modules (for example, the detection module 116 and the detection module 120), but the disclosure is not limited thereto. In other embodiments, the sample classification device 106 may only include a set of detection modules (for example, the detection module 116) according to sample classification requirements. In other embodiments, the sample classification device 106 may include three sets of detection modules or more according to sample classification requirements.

Please refer to FIG. 1 and FIG. 2, the pipeline valve control module 108 is connected to the sample classification device 106 and coupled to the computer equipment 102. The pipeline valve control module 108 is suitable for controlling the flow direction of the sample. The pipeline valve control module 108 includes at least one valve and at least one valve driving mechanism. In this embodiment, the pipeline valve control module 108 may include valves 126a to 126d and valve driving mechanisms 128a to 128d, but the disclosure is not limited thereto. The sample pipeline 118 in the sample classification device 106 is connected between the sample separating module 104 and the valve 126a. In addition, the valve 126a and the valve 126b may be connected to each other through the pipeline P1, the valve 126b and the valve 126c may be connected to each other through the pipeline P2, and the valve 126a and the valve 126d may be connected to each other through the pipeline P3. The valve driving mechanisms 128a to 128d are respectively connected to the corresponding valves 126a to 126d to control the opening and closing of the valves 126a to 126d. The valve driving mechanisms 128a to 128d are, for example, electric driving mechanisms or pneumatic driving mechanisms.

Referring to FIG. 1 and FIG. 2, the sample classification system 100 may further include multiple collection modules, and each collection module is connected to a corresponding valve in the pipeline valve control module. In this embodiment, the sample classification system 100 may include collection modules 130a to 130c. The collection module 130a can be connected to the valve 126c through the pipeline P4. The collection module 130b and the collection module 130c can be connected to different ports of the valve 126b through the pipeline P5 and the pipeline P6, respectively. The collection modules 130a to 130c are suitable for collecting classified samples. For example, the collection module 130a is suitable for collecting PRP, the collection module 130b is suitable for collecting plasma, and the collection module 130c is suitable for collecting red blood cells. The collection modules 130a to 130c are, for example, collection bags.

Please refer to FIG. 1, FIG. 2, FIG. 8A to FIG. 8C and FIG. 9A to FIG. 9C, the sample classification system 100 may further include a sample detection module 132. The sample detection module 132 is connected to the corresponding valve 126c in the pipeline valve control module 108, and is coupled to the computer equipment 102. The sample detection module 132 is suitable for detecting the classified samples (e.g., quality detection and/or quantity detection). The sample detection module 132 includes a micro channel 134 and an optical microscope 136. The micro channel 134 of the sample detection module 132 can be connected to the corresponding valve 126c. For example, the micro channel 134 may be connected to the corresponding valve 126c through the pipeline P7 in FIG. 2.

As shown in FIG. 8A to FIG. 8C and FIG. 9A to FIG. 9C, the micro channel 134 includes a sample detection area R1, and may further include at least one of a sample separating area R2 and a sample dilution area R3. The micro channel 134 may have a sample inlet 134a and a sample outlet 134b, and may have a diluent inlet 134c in the sample dilution area R3. The sample inlet 134a can be connected to the pipeline P7 in FIG. 2. The diluent can enter the micro channel 134 through the diluent inlet 134c to dilute the sample to a desired concentration.

The optical microscope 136 is suitable for detecting the sample detection area R1, and can return the detection result to the computer equipment 102. The magnification of the optical microscope 136 may be 40 times to 400 times. The optical microscope 136 may include an illumination light source 136a, an imaging optical component 136b, and an image sensor 136c, but the disclosure is not limited thereto. The illumination light source 136a can be configured to irradiate the sample in the micro channel 136, and project the image to the image sensor 136c (e.g., charge coupled device (CCD) or complementary metal oxide semiconductor (CMOS), etc.) through the imaging optical component 136b (e.g., microscope objective lens, etc.), and then the image sensor 136c returns the detection result to the computer equipment 102. In FIG. 8A to FIG. 8C, the optical path of the light emitted by the illumination light source 136a is schematically denoted by arrows, but the disclosure is not limited thereto.

In addition, the sample detection module 132 may further include an electrophoresis separating module 138. The electrophoresis separating module 138 is arranged around the micro channel 134 in the sample separating area R2. The electrophoresis separating module 138 may include a positive electrode 138a and a negative electrode 138b. The electrophoresis separating module 138 can control the size of the sample passing through the sample separating area R2 through the electrophoresis mechanism formed by the positive electrode 138a and the negative electrode 138b. For example, when the sample to be detected is PRP, the electrophoresis separating module 138 may be used to separate the red blood cells contained in the PRP, and allow the PRP to pass through the sample separating area R2.

In addition, the relative positions of the sample detection area R1, the sample separating area R2 and the sample dilution area R3 can be adjusted according to the separation and dilution method of the sample. As shown in FIG. 8A and FIG. 9A, the PRP can be separated from the sample in the sample separating area R2 first, and then the PRP is diluted in the sample dilution area R3, and finally the PRP is subjected to online detection in the sample detection area R1. As shown in FIG. 8B and FIG. 9B, the PRP in the sample can be diluted in the sample dilution area R3 first, and then PRP can be separated from the sample in the sample separating area R2, and finally the PRP is subjected to online detection in the sample detection area R1. As shown in FIG. 8C and FIG. 9C, the sample separating area R2 and the sample dilution area R3 can be the same area, so that the PRP in the sample can be separated and diluted simultaneously in the same area (i.e., the sample separating area R2 and the sample dilution area R3), and finally the PRP is subjected to online detection in the sample detection area R1.

Please refer to FIG. 2, the sample classification system 100 may further include a sample solution storage module 140. The sample solution storage module 140 is suitable for storing the sample solution to be separated. The sample solution storage module 140 is connected to the sample separating module 104. For example, the sample solution storage module 140 can be connected to the sample separating module 104 through the pipeline P8, the valve 126d, the pipeline P3, the valve 126a, and the sample pipeline 118, but the disclosure is not limited thereto. The sample solution storage module 140 is, for example, a sample solution storage bag, such as a blood bag.

Next, referring to FIG. 1 to FIG. 3, step S102 is performed, and the sample separating module 104 is used to separate multiple samples of different types in the sample solution. For example, when the sample separating module 104 is a centrifuge, due to the difference in volume and specific gravity and the effect of centrifugal force, different samples in the sample solution will be distributed in the centrifuge cylinder of the centrifuge in a concentric manner. The sample solution in the sample solution storage module 140 can be provided to the sample separating module 104 through the pipeline P8, the valve 126b, and the sample pipeline 118.

Then, step S104 is performed to sequentially provide different types of samples to the sample classification device 106 for the classification process. The classification process is performed to compare the reflected light spectrum of the sample obtained by the sample classification device 106 and the standard reflected light spectrum database to determine the type of sample. In some embodiments, when the sample separating module 104 is a centrifuge, the separated samples in the centrifuge are sequentially extruded from the center layer to the outer layer to the sample pipeline 118 and provided to the sample classification device 106.

As shown in FIG. 10, the classification process of samples may include the following steps. First, step S200 is performed to provide a standard reflected light spectrum database corresponding to multiple golden samples. For example, since the standard reflected light spectrum database corresponding to the multiple golden samples can be stored in the memory 110 of the computer equipment 102, the computer equipment 102 can provide the standard reflected light spectrum database corresponding to the multiple golden samples.

Then, referring to FIG. 7 and FIG. 10, proceed to step S202, the sample is irradiated with one selected from the light-emitting device 116a and the light-emitting device 116b and one selected from the light-emitting device 120a and the light-emitting device 120b, wherein the light emitted by one selected from the light-emitting device 116a and the light-emitting device 116b and the light emitted by one selected from the light-emitting device 120a and the light-emitting device 120b have different wavelengths. For example, when the light-emitting device 116a and the light-emitting device 120a are blue light-emitting devices, and the light-emitting device 116b and the light-emitting device 120b are red light-emitting devices, the light-emitting device 116a and the light-emitting device 120b can be selected to irradiate the sample, or the light-emitting device 116b and the light-emitting device 120a can be selected to irradiate the sample. The light-emitting device 116b and the light-emitting device 120a can simultaneously or alternately irradiate the sample. When the light-emitting device 116b and the light-emitting device 120a simultaneously irradiate the sample, the time for the classification process is short. When the light-emitting device 116b and the light-emitting device 120a alternately irradiate the sample, the light sources are less likely to interfere with each other. Taking the light-emitting device 116a and the light-emitting device 120b irradiating the sample as an example, since the light-emitting device 116a and the light-emitting device 120b do not emit light on the same side of the sample pipeline 118, it is possible to reduce the mutual interference on light sources. In addition, since the distance between the light-emitting device 116a and the light-emitting device 116b can be smaller than the distance between the light-emitting device 116a and the light-emitting device 120b, that is, the distance between the light-emitting device 116a and the light-emitting device 120b is longer, it is possible to prevent the blue reflected light from being interfered by the red light, and vice versa.

Next, proceed to step S204, the optical sensing device 116c receives the reflected light generated by one selected from the light-emitting device 116a and the light-emitting device 116b irradiating the sample, and the optical sensing device 120c receives the reflected light generated by one selected from the light-emitting device 120a and the light-emitting device 120b irradiating the sample, so as to obtain the reflected light spectrum of the sample. Taking the light-emitting device 116a and the light-emitting device 120b irradiating the sample as an example, the optical sensing device 116c can receive the reflected light generated by the light-emitting device 116a irradiating the sample in the sample pipeline 118, and the optical sensing device 120c can receive the reflected light generated by the light-emitting device 120b irradiating the sample in the sample pipeline 118.

Thereafter, step S206 is performed to compare the reflected light spectrum of the sample with the standard reflected light spectrum database to determine the type of the sample. For example, the computer equipment 102 can be used to compare the reflected light spectrum of the sample with the standard reflected light spectrum database. For example, the similarity between the reflected light spectrum of the sample and each standard reflected light spectrum in the standard reflected light spectrum database can be calculated first, and then the type of the sample can be determined based on the golden sample corresponding to the standard reflected light spectrum with the highest similarity. In this embodiment, since two sets of detection modules (i.e., the detection module 116 and the detection module 120) are adopted, the optical sensing device 116c and the optical sensing device 120c can simultaneously receive the corresponding reflected light, that is, the reflected light spectrum of light sources of different wavelengths can be acquired at one time, thereby speeding up the classification time. For example, under the circumstances that the light sources of the two sets of detection modules do not interfere with each other, the sample classification system 100 can obtain the reflection results of blue and red light at one time, so there is no need to repeatedly switch between different emission light sources and identification can be carried out easily.

Taking the light-emitting device 116a as a blue light-emitting device and the light-emitting device 120b as a red light-emitting device as an example, in an example where the light-emitting device 116a and the light-emitting device 120b are adopted to irradiate the sample, the reflected light spectrum of the blue light can be obtained by the optical sensing device 116c, and the reflected light spectrum of the red light can be obtained by the optical sensing device 120c. Then, the reflected light spectrum of blue light can be compared with the standard reflected light spectrum in the standard reflected light spectrum database. If the standard reflected light spectrum with the highest similarity to the reflected light spectrum of blue light is the standard reflected light spectrum S1 in FIG. 4, the sample can be determined as PRP. In addition, the reflected light spectrum of red light can be compared with the standard reflected light spectrum in the standard reflected light spectrum database. If the standard reflected light spectrum with the highest similarity to the reflected light spectrum of red light is the standard reflected light spectrum S2 in FIG. 5, the result of determining the sample as PRP can be supported. That is, the sample classification method of the embodiment can simultaneously classify samples by using multiple light sources of different wavelengths, thereby improving the accuracy of sample classification. In other embodiments, even if the intensity of the reflected light spectrum of the sample under test (e.g., red blood cells) irradiated by blue light is low and comparison cannot be made easily, it is still possible to adopt the reflected light spectrum of the sample under test irradiated by red light to determine the type of sample.

In this embodiment, although two sets of detection modules (e.g., detection module 116 and detection module 120) are used for sample classification, the disclosure is not limited thereto.

In another embodiment, only one set of detection modules (e.g., detection module 116) may be used to classify samples. In this case, as shown in FIG. 11, the classification process of the sample may include the following steps. First, step S300 is performed to provide a standard reflected light spectrum database corresponding to multiple golden samples. For example, the computer equipment 102 can provide a standard reflected light spectrum database corresponding to multiple golden samples.

Then, referring to FIG. 7 and FIG. 10, proceed to step S302 to irradiate the sample with the light-emitting device 116a and the light-emitting device 116b alternately. That is, when the light-emitting device 116a irradiates the sample, the light-emitting device 116b does not irradiate the sample, and vice versa. In this manner, it is possible to prevent the mutual interference between the light from the light-emitting device 116a and the light from the light-emitting device 116b.

Next, proceed to step S304, the optical sensing device 116c receives the reflected light generated by the light-emitting device 116a and the light-emitting device 116b irradiating the sample to obtain the reflected light spectrum of the sample. In this embodiment, since the light-emitting device 116a and the light-emitting device 116b alternately irradiate the sample, the optical sensing device 116c alternately receives the reflected light generated by the light-emitting device 116a and the light-emitting device 116b irradiating the sample.

After that, step S306 is performed to compare the reflected light spectrum of the sample with the standard reflected light spectrum database to determine the type of the sample. For example, the computer equipment 102 can be used to compare the reflected light spectrum of the sample with the standard reflected light spectrum database. In addition, since the comparison method in step S306 is similar to the comparison method in step S206, related description in this regard can be derived from the description of step S206, and no further description is incorporated herein.

In some embodiments, in order to overcome the problem of light source aging and attenuation, various golden samples can be irradiated by light sources with different luminous intensity to obtain standard reflected light spectra corresponding to different luminous intensities irradiating various golden samples. In this way, even if the light source is aging and attenuated, it is possible to determine the type of samples by comparing the reflected light spectrum of the sample with the standard reflected light spectrum database.

In other embodiments, the corrected reflected light intensity value of the sample to be classified can be estimated by the following formula to solve the problem of aging and attenuation of the light source.

$$\text{Reflected light intensity value after correction (sample to be classified)} =$$
$$\text{Reflected light intensity value (sample to be classified)} \times$$
$$\frac{\text{Standard reflected light intensity value (sample under test)}}{\text{Reflected light intensity detection value (sample under test)}}$$

First, under the condition of 100% light intensity, the standard reflected light intensity value of the sample under test is recorded. Then, before the sample classification step is performed, the sample under test is adopted to detect the reflected light intensity detection value, so as to know the degree of aging of the light source, and thereby obtaining the correction ratio (i.e., the ratio of the standard reflected light intensity value to the reflected light intensity detection value). After the reflected light intensity value of the sample to be classified is obtained, the reflected light intensity value of the sample to be classified is multiplied by the correction ratio to obtain the corrected reflected light intensity value of the sample to be classified. In this way, the reflected light spectrum exhibited by the corrected reflected light intensity value can be compared with the standard reflected light spectrum database.

Next, referring to FIG. 1 to FIG. 3, step S106 is performed, and the pipeline valve control module 108 determines the flow direction of different types of samples according to the classification result of the classification process. For example, the computer equipment 102 can control the opening and closing of the valves 126a to 126d in the pipeline valve control module 108 according to the classification result of the classification process, thereby controlling the flow direction of the sample from the sample classification device 106.

In addition, step S108 may be performed to enable the sample whose flow direction is determined by the pipeline valve control module 108 to flow into the corresponding collection module. For example, a sample determined to be PRP can flow into a collection module 130a suitable for collecting PRP, a sample determined to be plasma can flow into a collection module 130b suitable for collecting plasma, and a sample determined to be red blood cells can flow into a collection module 130c suitable for collecting red blood cells.

In addition, step S110 may be performed, and the sample detection module 132 performs sample detection on the classified samples. In this way, the detection results of the samples (e.g., quality detection results and/or quantity detection results) can be obtained online in real time. For example, it is necessary to know the number and quality of cells in the terminal product after separation before performing PRP treatment. For separated cells, if an additional cell counter is required to obtain the relevant product quantity/ quality information, there will be degradation in product quality and increase in time. However, since the sample classification method of this embodiment allow the quantity detection and quality detection to be performed online in real time, it is possible to improve product quality and reduce time.

Sample detection may include the following steps. A part of the sample whose flow direction is determined by the pipeline valve control module 108 flows into the sample detection module 132. The sample is detected by the optical microscope 136, and the detection result is returned. In addition, before detecting the sample, the sample can be diluted. As shown in FIG. 8A to FIG. 8C, the diluent can enter the micro channel 134 from the diluent inlet 134c to dilute the sample to a desired concentration. In addition, before the sample is detected, the sample can be purified. As shown in FIG. 8A to FIG. 8C, the purification process, for example, uses the electrophoresis mechanism of the electrophoresis separating module 138 to control the size of the sample passing through the sample separating area R2. For example, when the sample to be detected is PRP, the electrophoresis separating module 138 may be used to separate the red blood cells and the like contained in the PRP, and the PRP is allowed to pass through the sample separating area R2 to be purified.

In summary, in the sample classification device, sample classification system, and sample classification method described in the foregoing embodiments, the sample in the sample pipeline is irradiated by a variety of light-emitting devices of different wavelengths, and then the optical sensing device receives the reflected light of the sample to obtain the reflected light spectrum of the sample. Thereafter, the reflected light spectrum of the sample is compared with the standard reflected light spectrum database, thereby accurately determining the type of the sample. In addition, in the case that the sample classification system includes a sample detection module, the detection result of the sample can be obtained online in real time.

Although the disclosure has been disclosed as above by way of embodiments, it is not intended to limit the disclosure. Any person with ordinary knowledge in the technical field can make some changes and decorations without departing from the spirit and scope of the disclosure, so the protection scope of the disclosure shall be determined by the scope of the attached claims.

What is claimed is:

1. A sample classification device, comprising:
   a carrier;
   a first detection module, comprising:
   a first light source, located on the carrier and configured to emit a light of a first wavelength;
   a second light source, located on the carrier and configured to emit a light of a second wavelength, wherein the first wavelength is different from the second wavelength; and
   a first optical sensor, located on the carrier and between the first light source and the second light source;
   a sample pipeline, located above the carrier and passing above the first optical sensor; and
   a second detection module, comprising:
   a third light source, located on the carrier and configured to emit the light of the first wavelength;
   a fourth light source, located on the carrier and configured to emit the light of the second wavelength; and
   a second optical sensor, located on the carrier and between the third light source and the fourth light source, wherein the sample pipeline passes above the second optical sensor, wherein
   the first light source and the fourth light source are located on different sides of the sample pipeline,
   the second light source and the third light source are located on different sides of the sample pipeline,
   a distance between the first light source and the second light source is smaller than a distance between the first light source and the fourth light source and a distance between the second light source and the third light source, and
   a distance between the third light source and the fourth light source is smaller than the distance between the first light source and the fourth light source and the distance between the second light source and the third light source.

2. The sample classification device according to claim 1, wherein the first light source and the second light source are located on different sides of the sample pipeline.

3. The sample classification device according to claim 1, wherein the third light source and the fourth light source are located on different sides of the sample pipeline.

4. A sample classification system, comprising:
   a computer equipment;
   a sample separating module, coupled to the computer equipment;
   a sample classification device, connected to the sample separating module and coupled to the computer equipment, wherein
   the sample classification device comprises:
   a carrier;
   a first detection module, comprising:
   a first light source, located on the carrier and configured to emit a light of a first wavelength;
   a second light source, located on the carrier and configured to emit a light of a second wavelength, wherein the first wavelength is different from the second wavelength; and
   a first optical sensor, located on the carrier and between the first light source and the second light source;
   a sample pipeline, located above the carrier and passing above the first optical sensor; and
   a second detection module, comprising:
   a third light source, located on the carrier and configured to emit the light of the first wavelength;
   a fourth light source, located on the carrier and configured to emit the light of the second wavelength; and
   a second optical sensor, located on the carrier and between the third light source and the fourth light source, wherein the sample pipeline passes above the second optical sensor, wherein
   the first light source and the fourth light source are located on different sides of the sample pipeline,
   the second light source and the third light source are located on different sides of the sample pipeline,
   a distance between the first light source and the second light source is smaller than a distance between the first light source and the fourth light source and a distance between the second light source and the third light source, and
   a distance between the third light source and the fourth light source is smaller than the distance between the first light source and the fourth light source and the distance between the second light source and the third light source; and a pipeline valve control module, connected to the sample classification device and coupled to the computer equipment.

5. The sample classification system according to claim 4, wherein the sample separating module comprises a centrifuge.

6. The sample classification system according to claim 4, wherein the pipeline valve control module comprises:
- at least one valve, wherein the sample pipeline in the sample classification device is connected between the sample separating module and the valve; and
- at least one valve driving mechanism, connected to the at least one valve.

7. The sample classification system according to claim 6, further comprising:
- a plurality of collection modules, wherein each of the collection modules is connected to the corresponding valve.

8. The sample classification system according to claim 6, further comprising:
- a sample detection module, connected to the corresponding valve and coupled to the computer equipment, wherein the sample detection module comprises:
  - a micro channel, connected to the corresponding valve, and comprising a sample detection area; and
  - an optical microscope, suitable for detecting the sample detection area.

9. The sample classification system according to claim 8, wherein the sample detection module further comprises:
- an electrophoresis separating module, wherein the micro channel further comprises a sample separating area, and the electrophoresis separating module is arranged around the micro channel in the sample separating area.

10. The sample classification system according to claim 8, wherein the micro channel further comprises a sample dilution area, and the micro channel has a diluent inlet in the sample dilution area.

* * * * *